United States Patent
Zhai

(10) Patent No.: US 8,806,496 B2
(45) Date of Patent: Aug. 12, 2014

(54) VIRTUALIZING A PROCESSOR TIME COUNTER DURING MIGRATION OF VIRTUAL MACHINE BY DETERMINING A SCALING FACTOR AT THE DESTINATION PLATFORM

(75) Inventor: Gang Zhai, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 12/570,158

(22) Filed: Sep. 30, 2009

(65) Prior Publication Data

US 2011/0078688 A1  Mar. 31, 2011

(51) Int. Cl.
*G06F 9/46* (2006.01)
*G06F 9/50* (2006.01)
*G06F 9/48* (2006.01)
*G06F 9/455* (2006.01)

(52) U.S. Cl.
CPC ............ *G06F 9/5077* (2013.01); *G06F 9/4825* (2013.01); *G06F 9/45545* (2013.01); *G06F 9/45541* (2013.01); *G06F 9/4856* (2013.01)
USPC ........... 718/102; 718/108; 713/100; 713/501; 713/502; 709/248

(58) Field of Classification Search
CPC . G06F 9/4825; G06F 9/5077; G06F 9/45545; G06F 9/45541; G06F 9/4856; G06F 9/5088
USPC ............ 718/102, 108; 713/100, 501; 709/248
See application file for complete search history.

(56) References Cited

U.S. PATENT DOCUMENTS

| | | | |
|---|---|---|---|
| 7,194,556 B2 * | 3/2007 | Rajagopal et al. ............ 709/248 |
| 7,490,191 B2 | 2/2009 | Illikkal et al. |
| 7,681,199 B2 * | 3/2010 | Gootherts et al. ............ 718/108 |
| 7,788,664 B1 * | 8/2010 | Janakiraman et al. ............ 718/1 |
| 8,020,020 B2 * | 9/2011 | Serebrin ........................ 713/375 |
| 8,095,929 B1 * | 1/2012 | Ji et al. .............................. 718/1 |
| 2005/0132364 A1 * | 6/2005 | Tewari et al. ..................... 718/1 |
| 2009/0183153 A1 * | 7/2009 | Wang et al. ....................... 718/1 |
| 2010/0077394 A1 * | 3/2010 | Wang et al. ....................... 718/1 |
| 2011/0047315 A1 * | 2/2011 | De Dinechin et al. ............ 711/6 |
| 2011/0055828 A1 * | 3/2011 | Amsden ............................ 718/1 |

* cited by examiner

*Primary Examiner* — Meng An
*Assistant Examiner* — Abu Ghaffari
(74) *Attorney, Agent, or Firm* — Trop, Pruner & Hu, P.C.

(57) ABSTRACT

In one embodiment, the present invention includes a method for determining a scaling factor between a frequency of a first processor and a frequency of a second processor after a guest software is migrated from first processor to the second processor, and executing the guest software on the second processor using a virtual counter based on a physical counter of the second processor and the scaling factor. Other embodiments are described and claimed.

12 Claims, 4 Drawing Sheets

VIRTUALIZING A PROCESSOR TIME COUNTER DURING MIGRATION OF VIRTUAL MACHINE BY DETERMINING A SCALING FACTOR AT THE DESTINATION PLATFORM

BACKGROUND

As microprocessors and computer systems advance, greater amounts of software can be executed on a single platform. To accommodate different software that may be written for different platforms and operating systems (OSs), virtualization technologies can be used. Virtualization enables multiple OSs and various software to execute on a single platform. Using virtualization techniques, a software application may consider itself to be the only entity executing on a platform, although multiple applications may be concurrently executing.

Virtualization is typically implemented by using software (e.g., a virtual machine monitor (VMM)) to present to each OS a virtual machine (VM) having virtual resources, including one or more virtual processors that the OS may completely and directly control, while the VMM maintains a system environment for implementing virtualization policies such as sharing and/or allocating physical resources of the system among the VMs. Each OS and other software that runs on a VM is referred to as a guest or guest software, while a host or host software is software such as a VMM that runs outside of the virtualization environment.

Thus virtualization technologies allow multiple guest software (generally, guests) to simultaneously run on a single host or physical platform. A guest executing on a system may see a virtual central processing unit (CPU) which appears to the guest as a physical CPU having the same frequency as the physical CPU. In many instances, a guest relies on a CPU time counter for time keeping.

In various environments, when a guest is migrated from one physical platform to another, the physical CPU of the new platform may operate at a different frequency than the CPU of the original platform. This causes a change in the rate of the time counter for the physical CPU that the guest runs on, which can create difficulties for operations of the guest that rely on a time keeping function and can even cause a crash.

DETAILED DESCRIPTION

Embodiments may implement a scaling mechanism between a physical time counter and a virtual time counter. In other words, a processor such as a CPU can be configured so that a guest does not read a physical time counter directly, but instead reads a virtual time counter. In various embodiments, the virtual time counter can be determined by associating the physical counter with a configurable scale factor. As an example, the virtual time counter can be determined by multiplying the physical time counter by a scaling factor. This scaling factor may be expressed as a percentage or other coefficient value, and in one embodiment can be defined as a ratio between old processor frequency and new processor frequency (e.g., frequency CPU old/frequency CPU new). Note that this scale factor may be configured when a guest is migrated to a different type of CPU or a CPU having a different frequency. In this way, the guest accesses a time counter having a constant frequency across migration.

Using virtualization in accordance with an embodiment of the present invention, after migration to a different CPU a guest can read a virtual counter without VMM intervention. To enable virtual counter reading, the CPU can make a calculation in the guest context. This calculation may be performed by reading the physical counter on behalf of the guest OS, and then calculating the proper value (of the virtual counter) to be provided to the guest. In this way, the virtual counter is transparent to the guest OS, which instead believes it has accessed the physical counter. From the VMM point of view, the guest OS sees a virtual counter (a logical concept).

Figure 1:
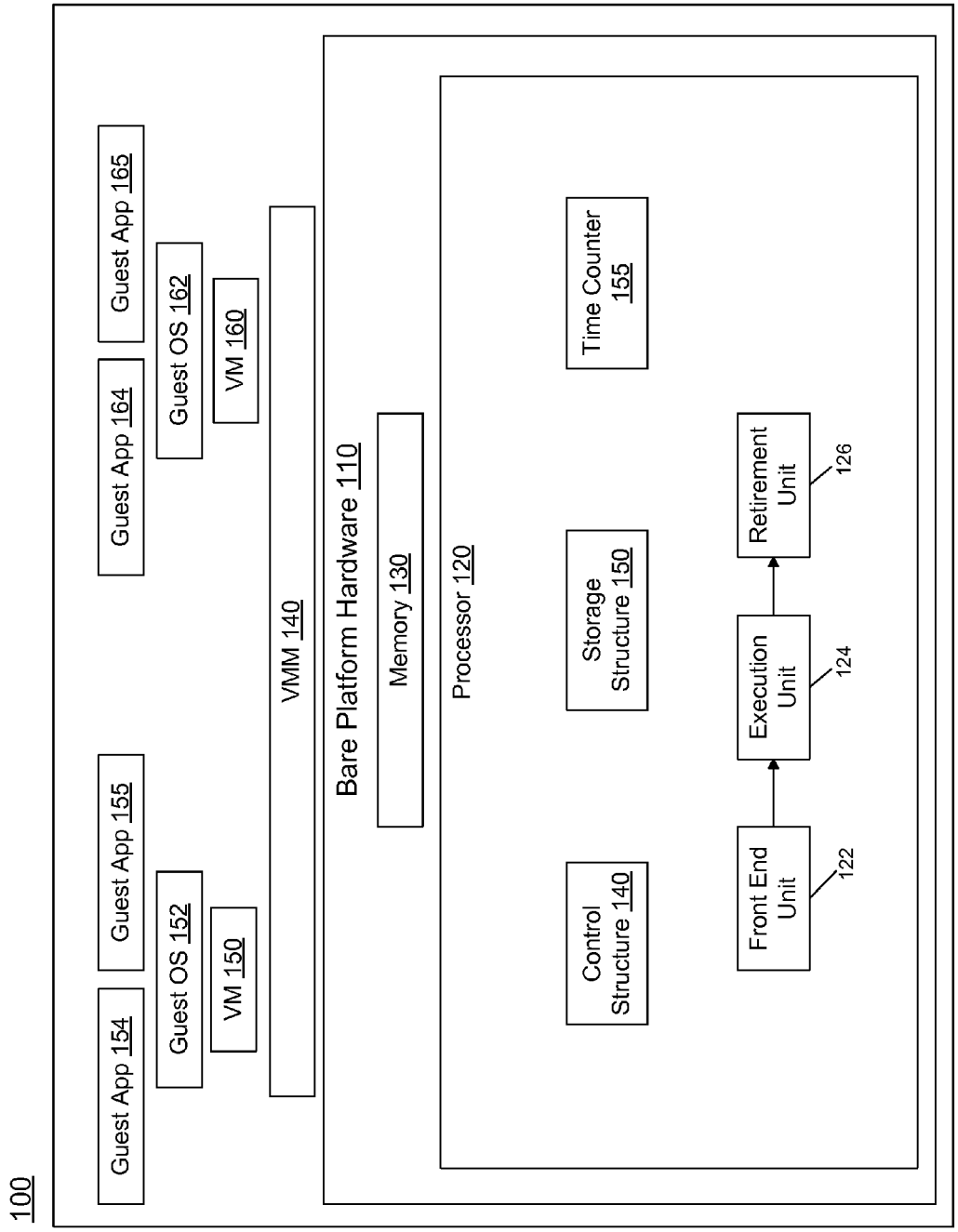
FIG. 1 is a block diagram of a system in accordance with one embodiment of the present invention.

FIG. 1 illustrates a system in accordance with one embodiment of the present invention. Although FIG. 1 shows an embodiment of a virtualization architecture 100, it is to be understood that embodiments may also be implemented in other architectures, systems, platforms, or environments.

In FIG. 1, a bare platform hardware 110 is present and may correspond to any type of computer system that can execute OS or VMM software. For example, bare platform hardware may be that of a personal computer, mainframe computer, portable computer, handheld device, set-top box, server, or any other computing system. As seen in FIG. 1, bare platform hardware 110 includes a processor 120 and a memory 130.

Processor 120 may be any type of processor, including a general-purpose microprocessor, such as a multi-core processor, microcontroller, or programmable logic. Although FIG. 1 shows only one such processor 120, bare platform hardware 110 may include multiple processors, including any number of multi-core processors, each with any number of execution cores, and any number of multithreaded processors, each with any number of threads.

As seen in the embodiment of FIG. 1, processor 120 includes a front end unit 122 that can retrieve and prepare instructions for execution in an execution unit 124, which may include various logic units, and a retirement unit 126 to handle retirement of executed instructions. As further seen, processor 120 includes a control structure 140, which may store various status and control registers and so forth, and a storage structure 150, which may include one or more register files. As further seen, a time counter 155, namely a physical time counter which may be configured to count clock cycles is present. In one embodiment, counter 155 may be configured to receive a clock signal at an operating frequency of the processor (i.e., $f_{CPU}$) that is provided to the various components of the processor. Bare platform hardware 110 may further include at least one memory 130, which in one embodiment may be dynamic random access memory (DRAM). Bare platform hardware 110 may also include any number of additional devices or connections.

In addition to bare platform hardware 110, FIG. 1 illustrates a VMM 140, VMs 150 and 160, guest operating systems 152 and 162, and guest applications 154, 155, 164, and 165.

VMM 140 may be any software, firmware, or hardware host installed on or accessible to bare platform hardware 110 to present VMs, i.e., abstractions of bare platform hardware 110, to guests or to otherwise create and manage VMs and implement virtualization policies. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

In the embodiment of FIG. 1, guest OS 152 and guest applications 154 and 155 are installed on VM 150 and guest OS 162 and guest applications 164 and 165 are installed on VM 160. Although shown with only two VMs and two applications per VM in the embodiment of FIG. 1, the scope of the present invention is not limited in this regard.

Figure 2:
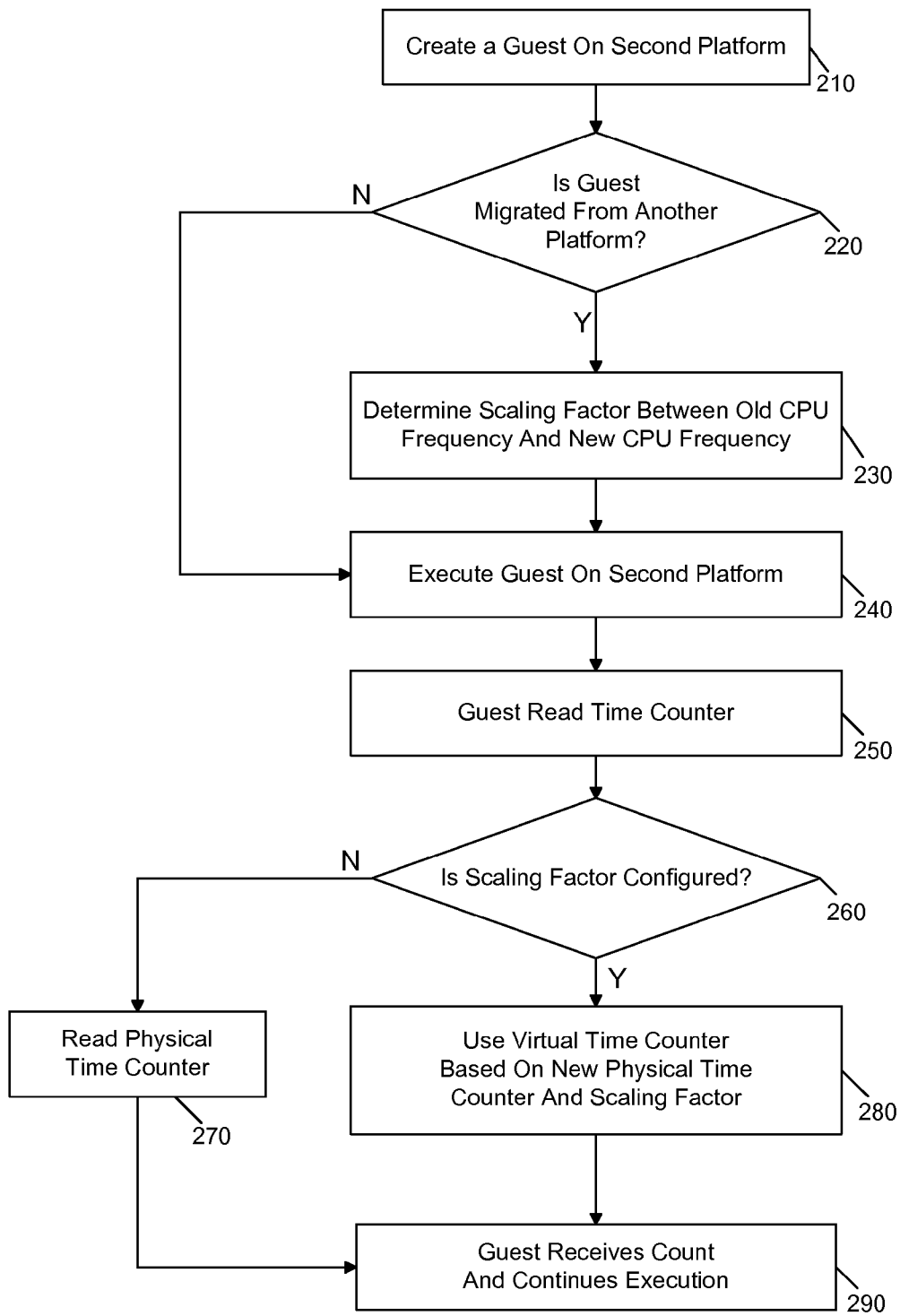
FIG. 2 is a flow diagram of a method in accordance with one embodiment of the present invention.

Referring now to FIG. 2, shown is a flow diagram of a method in accordance with one embodiment of the present invention. Method 200 may be used in the course of executing guest software that has migrated between a first platform and a second platform. That is, after a guest is executed on the first platform, it is migrated to the second platform. For example, the guest may correspond to a first OS that is executing on a first platform, which may be a server system having a CPU that runs at a frequency of 3.0 gigahertz (GHz), for example. During execution of the guest, a physical time counter of the CPU may be used. For example, various counters that operate during guest OS or guest software execution may be updated according to this physical time counter. As an example, a guest OS may read the counter value to provide a current time. Note that this physical time counter may be a hardware counter of the CPU that counts processor clock cycles. Thus this physical time counter itself may be updated based on the operating frequency of the CPU. Of course, the counters can be any type of counter and are not limited to time counters.

Then the guest is migrated to another CPU. For example, due to load balancing or other conditions in a network or a purchase of a new machine by a user, a guest may be migrated from the first platform to a second platform, e.g., via a network link. While this platform may be typically of the same architecture and may include substantially the same components, in many instances there may be differences between the first and second platforms. Assume for purposes of discussion that this second platform has a CPU that operates at a different operating frequency, e.g., a higher frequency of 4.0 GHz.

As seen in FIG. 2, method 200 may be used to execute the guest on the second platform, and may begin by creating the guest on the second platform (block 210). Various operations to set up control structures and so forth may be performed in creating the guest. This guest may be the guest transferred from the first platform or in some instances it may be a guest originally created for the second platform. At diamond 220 it may be determined whether the guest is migrated from another platform. If not, control passes directly to block 240, where the guest may be executed on the second platform. Otherwise, if the guest has been migrated from another platform, control passes to block 230 where a scaling factor may be determined. More specifically, the scaling factor may be calculated as a ratio between the old CPU frequency and the new CPU frequency. Understand that during the migration, various information associated with the guest including its state and operating parameters of the original platform, including frequency of the original CPU, may be provided from the first platform to the second platform. Accordingly, the information passed during migration may be used to determine the scaling factor. This scaling factor may be used in generating a virtual time counter for use by the guest in the second platform so that various counting operations performed by the guest may operate correctly in the second platform.

Thus as seen in FIG. 2, control passes to block 240 where the guest may execute on the second platform. During execution of the guest, the guest may request to read a time counter (block 250). For example, a guest instruction may be to read a time counter. Accordingly, control passes to diamond 260 where it may be determined whether the scaling factor is configured, namely if guest has been migrated, the scaling factor is configured, otherwise it is not. If the guest is executing on its original platform, control passes to block 270, where the physical time counter may be read. Accordingly, the value of the physical time counter of the CPU is obtained and provided to the guest, which continues its execution (block 290). If instead at diamond 260 it is determined that the scaling factor is configured, i.e., the guest has been migrated from another platform, control passes to block 280. Here, instead of directly using a physical time counter of the CPU during execution, embodiments may instead use a virtual time counter that is based on the scaling factor and the physical time counter of the new CPU (block 280). As one example, this virtual counter may be determined as follows:

$$(f_{CPU1}/f_{CPU2}) \times PC_{CPU2} \qquad [EQ. 1]$$

where $f_{CPU1}$ is the clock frequency of the CPU of the first platform, $f_{CPU2}$ is the clock frequency of the CPU of the second platform (together the ratio represents the scaling factor), and $PC_{CPU2}$ is the physical time counter of the CPU of the second platform. Control then passes to block 290, where the virtual time counter value may be provided to the guest. While shown with this particular implementation in the embodiment of FIG. 2, understand that the scope of the present invention is not limited in this regard. For example, while the migration is described as between platforms, implementations can be used in migrating software between two heterogeneous processors of a system (e.g., operating at different frequencies).

Figure 3:
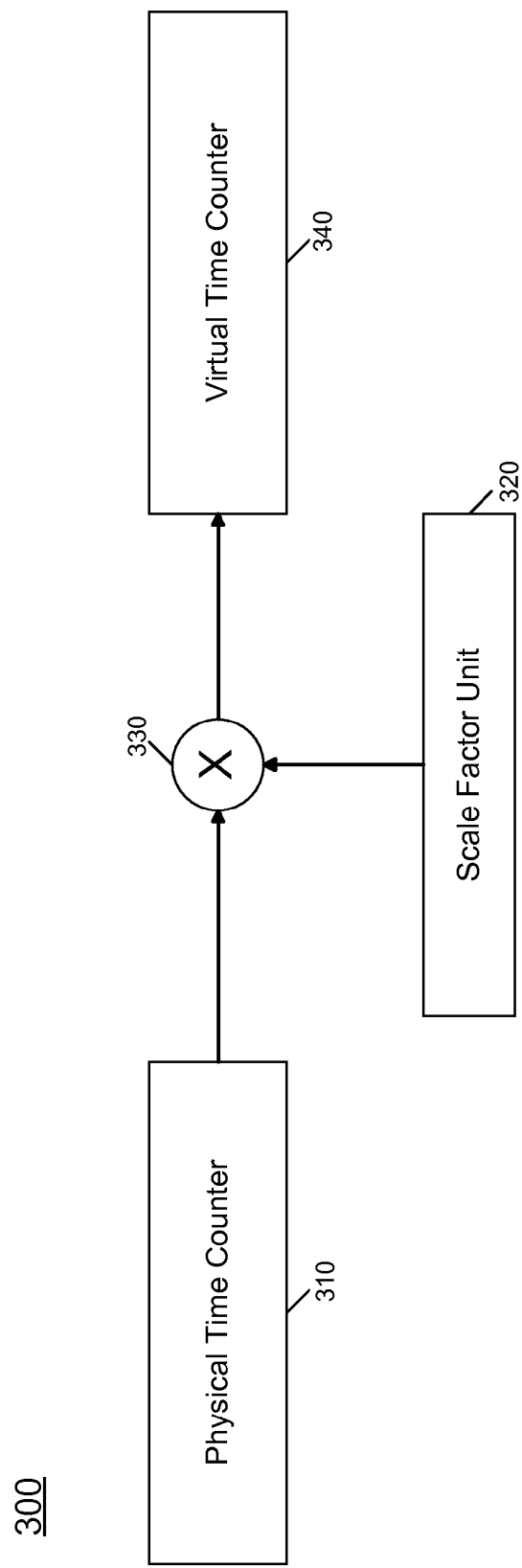
FIG. 3 is a block diagram of logic to generate a virtual time counter in accordance with one embodiment of the present invention.

Some embodiments may be implemented in logic of a processor. Referring now to FIG. 3, shown is a block diagram of logic to generate a virtual time counter in accordance with one embodiment of the present invention. As shown in FIG. 3, logic 300 may include a physical time counter 310. This time counter may be a time counter of a processor that counts clock cycles of the processor, e.g., according to the operating speed of the processor. While shown as being part of logic 300, understand that in other implementations, this physical time counter may be located elsewhere and instead a time counter signal output by the counter may be sent to logic 300.

Logic 300 may further include a multiplier 330 that multiplies the value of this physical time counter by a scale factor received from a scale factor unit 320. In various embodiments, the scale factor may be a ratio that is determined based on the operating frequency of an original CPU on which a guest is executed and an operating frequency of the current CPU, and which may be determined in scale factor unit 320. Scale factor unit 320 may further include a storage such as a register to store this scale factor so that it need only calculate the scale factor a single time for a given migration. Accordingly, the output of multiplier 330 may be a virtual time counter 340. This virtual time counter 340 may thus provide an output to a guest for use in operation of the guest. In this way, the guest sees a virtual time counter as a physical time counter. While shown with this particular implementation in the embodiment of FIG. 3, the scope of the present invention is not limited in this regard. For example, in some embodiments, the scale factor unit can be implemented in microcode for performing a read time counter intervention, VMM code or so forth. In these implementations, the logic may thus receive and use the scaling factor in calculating the virtual counter value.

Using embodiments of the present invention, limitations for guest migration (such as requiring the same type CPU) can be eliminated, and a guest can smoothly migrate to a latest CPU with a higher frequency. As such, a consumer can frequently upgrade CPUs for a virtualization solution without compromising operation of virtualization software. Still further, embodiments avoid the need for a guest to trap into a host any time a guest needs to read a time counter, which can be very inefficient as a context switch between guest and host is expensive and a guest may often need to read a counter.

Figure 4:
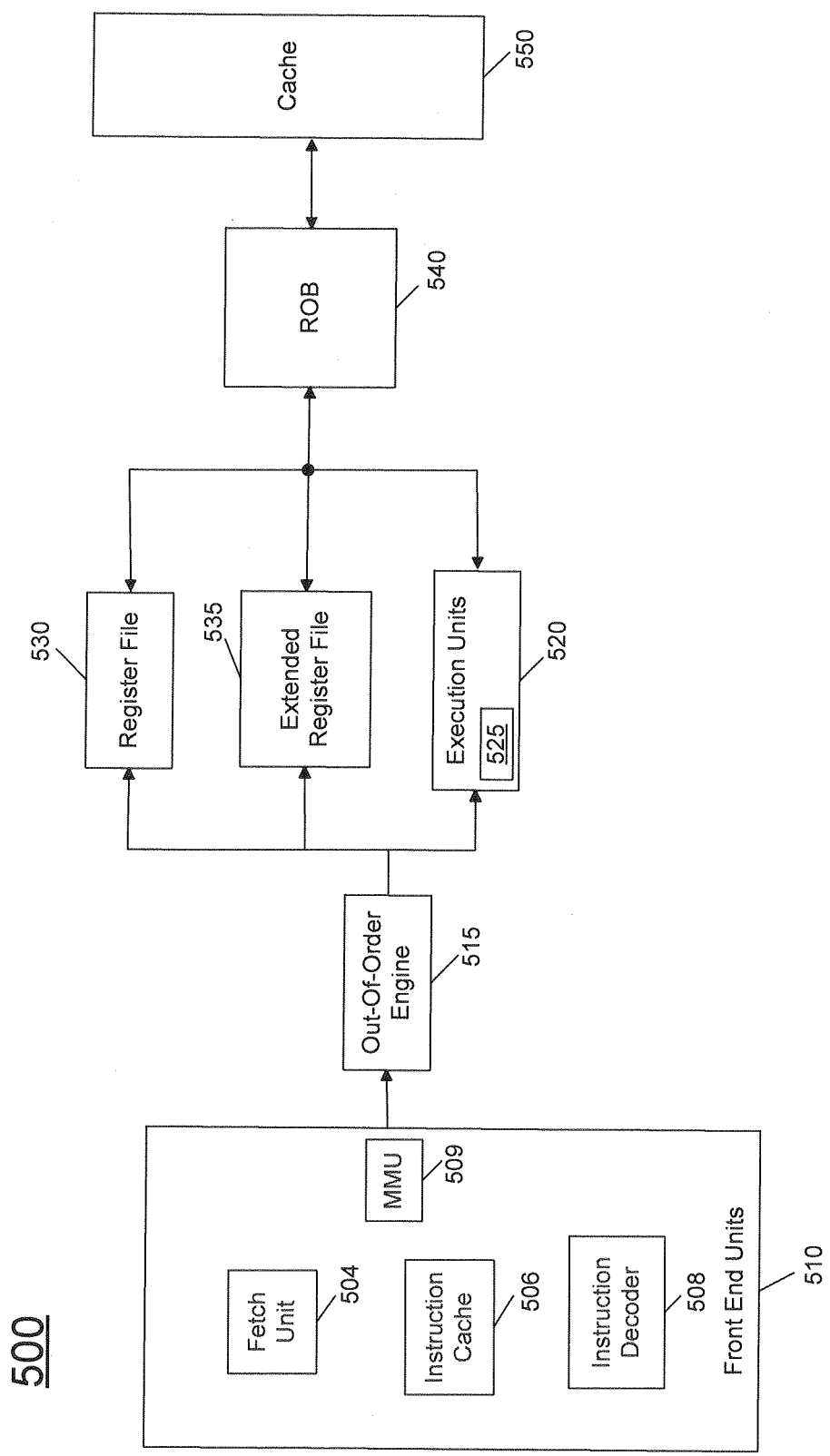
FIG. 4 is a block diagram of a processor in accordance with one embodiment of the present invention.

Referring now to FIG. 4, shown is a block diagram of a processor in accordance with one embodiment of the present invention. As shown in FIG. 4, processor 500 may be a multi-stage pipelined out-of-order processor. Processor 500 is shown with a relatively simplified view in FIG. 4 to illustrate various features used in connection with virtual time scaling in accordance with an embodiment of the present invention.

As shown in FIG. 4, processor 500 includes front end units 510, which may be used to fetch instructions to be executed and prepare them for use later in the processor. For example, front end units 510 may include a fetch unit 504, an instruction cache 506, and an instruction decoder 508. In some implementations, front end units 510 may further include a trace cache, along with microcode storage as well as a micro-operation storage. Fetch unit 504 may fetch macro-instructions, e.g., from memory or instruction cache 506, and feed them to instruction decoder 508 to decode them into primitives, i.e., micro-operations for execution by the processor. Front end units 510 further includes a memory management unit (MMU) 509 to handle translation of virtual addresses to physical addresses.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. In addition, a logic 525, which may be a virtual time logic such as shown in FIG. 3, may be present. Results may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 4, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 4, understand the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining, at a second platform using a virtual time logic of a second processor of the second platform, a scaling factor between a first frequency of a first processor of a first platform and a second frequency of the second processor of the second platform responsive to migration of guest software from the first platform to the second platform, wherein the second processor is distinct from the first processor and the second processor is coupled to the first processor via a network coupling, and wherein the second frequency is different from the first frequency, the scaling factor corresponding to a ratio of the first frequency of the first processor to the second frequency of the second processor, and
    executing the guest software on the second platform using a virtual time counter corresponding to a value of a physical time counter of the second processor multiplied by the scaling factor.

2. The method of claim 1, further comprising providing a value of the virtual time counter responsive to a request to read a time counter during execution of the guest software on the second platform.

3. The method of claim 1, further comprising using the virtual time counter during execution of the guest software on the second platform without intervention of a virtual machine monitor (VMM).

4. An apparatus comprising:
    a first processor of a first platform, the first processor having:
        at least one execution unit to execute instructions provided by a front end unit;
        a physical counter to count at a first frequency of the first processor; and
        a logic to determine a scaling factor based on a second frequency of a second processor of a second platform, wherein the second frequency differs from the first frequency, the second frequency received from the second platform responsive to migration of guest software from the second platform to the first platform, wherein the first processor of the first platform is coupled to the second processor of the second platform via a network link, and wherein the scaling factor corresponds to a ratio of the second frequency platform to the first frequency, the logic to multiply the scaling factor by a value of the physical counter to obtain a value of a virtual time counter;

wherein the first processor is to execute the guest software on the first platform using the value of the virtual time counter obtained by the logic.

5. The apparatus of claim 4, wherein the logic is to output the value of the virtual time counter responsive to execution by the first processor of an instruction of the guest software that includes a request to read a time counter.

6. The apparatus of claim 5, wherein the guest software is to use the virtual time counter value to generate a current time.

7. A system comprising:
a first processor of a first platform, the first processor including:
a front end unit to obtain and decode instructions of a guest software;
at least one execution unit coupled to the front end unit to execute the instructions of the guest software;
a first physical counter to count at a first frequency of the first processor;
a scale factor logic to generate a scaling factor corresponding to a ratio of a second frequency of a second processor of a second platform to the first frequency of the first processor responsive to migration of the guest software to the first processor from the second processor, wherein the first frequency differs from the second frequency, and wherein the second processor is coupled to the first processor via a network link;
a logic to multiply the scaling factor by a value of the first physical counter to obtain a value of a virtual time counter; and
a retirement unit to handle retirement of executed instructions;
wherein the first processor is to execute the guest software on the first platform using the value of the virtual time counter obtained by the logic; and
a dynamic random access memory (DRAM) coupled to the first processor.

8. The system of claim 7, further comprising a virtual machine monitor (VMM) to execute on the first processor, wherein the guest software is to obtain the value of the virtual time counter without intervention of the VMM.

9. The method of claim 1, further comprising storing the scaling factor and determining a virtual time using the stored scaling factor in response to each request to read a time counter during the execution of the guest software on the second platform.

10. The apparatus of claim 4, wherein the first processor includes a storage to store the scaling factor determined by the logic and wherein the logic is to provide the value of the virtual time counter via use of the scaling factor retrieved from the storage, responsive to a request to read a time counter during execution of the guest software on the first platform.

11. The system of claim 7, wherein the first processor includes a storage to store the scaling factor determined by the logic and wherein the logic is to provide the value of the virtual time counter via use of the scaling factor retrieved from the storage, responsive to a request to read a time counter during execution of the guest software on the first platform.

12. The system of claim 7, wherein the scale factor logic is implemented in software.

* * * * *